US010860110B1

United States Patent
Files et al.

(12) United States Patent
(10) Patent No.: US 10,860,110 B1
(45) Date of Patent: Dec. 8, 2020

(54) SYSTEM AND METHOD TO ENABLE VIRTUAL TOUCHPAD WITH HAPTIC FEEDBACK ON DUAL DISPLAY INFORMATION HANDLING SYSTEMS

(71) Applicant: Dell Products L.P., Round Rock, TX (US)

(72) Inventors: Jace W. Files, Round Rock, TX (US); John T. Morrison, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/656,733

(22) Filed: Oct. 18, 2019

(51) Int. Cl.

| | |
|---|---|
| ***G06F 3/01*** | (2006.01) |
| ***G06F 3/0488*** | (2013.01) |
| ***G06F 1/16*** | (2006.01) |
| ***G06F 3/14*** | (2006.01) |

(52) U.S. Cl.
CPC ........... *G06F 3/016* (2013.01); *G06F 1/1647* (2013.01); *G06F 1/1662* (2013.01); *G06F 3/04886* (2013.01); *G06F 3/1446* (2013.01); *G06F 2203/014* (2013.01)

(58) Field of Classification Search
CPC .... G06F 3/016; G06F 3/04886; G06F 3/1446; G06F 1/1647; G06F 1/1662
USPC .......................... 345/168, 173, 174; 715/773
See application file for complete search history.

(56) References Cited

U.S. PATENT DOCUMENTS

| | | | | |
|---|---|---|---|---|
| 6,424,338 | B1 * | 7/2002 | Anderson | G06F 3/0213 178/18.01 |
| 8,259,080 | B2 * | 9/2012 | Casparian | G06F 1/1647 345/173 |
| 2009/0322687 | A1 * | 12/2009 | Duncan | G06F 3/04883 345/173 |
| 2010/0064244 | A1 * | 3/2010 | Kilpatrick, II | G06F 1/1649 715/773 |
| 2012/0038562 | A1 * | 2/2012 | Holman, IV | G06F 3/0436 345/173 |
| 2012/0127088 | A1 * | 5/2012 | Pance | G06F 3/04812 345/173 |
| 2014/0035870 | A1 * | 2/2014 | Yeh | G06F 3/0446 345/174 |
| 2019/0187792 | A1 * | 6/2019 | Basehore | G06F 3/017 |
| 2020/0004349 | A1 * | 1/2020 | Yildiz | G06F 3/044 |

* cited by examiner

*Primary Examiner* — Prabodh M Dharia
(74) *Attorney, Agent, or Firm* — Baker Botts L.L.P.

(57) ABSTRACT

A disclosed method and information handling system configurable for operating as a dual display information handling system or a single display information handling system. In a single display device configuration, visual content is displayed on a first device and a GUI-based virtual touchpad is launched on a second device. If there is user contact sensed relative to the virtual touchpad, a processor determines if the contact corresponds to a left-click command, a right-click command or contact moving across the virtual touchpad. The processor selects a click waveform or a moving contact waveform and one or more piezoelectric disks coupled to the second device display layer generate forces based on a waveform for emulating a left-click or a right-click or for emulating moving contact.

14 Claims, 5 Drawing Sheets

SYSTEM AND METHOD TO ENABLE VIRTUAL TOUCHPAD WITH HAPTIC FEEDBACK ON DUAL DISPLAY INFORMATION HANDLING SYSTEMS

BACKGROUND

Field of the Disclosure

This disclosure relates generally to information handling systems with dual-displays and, more particularly, to systems and methods for enabling a virtual touchpad with haptic feedback.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments disclosed herein launch a GUI of a virtual touchpad and include a haptic engine under a glass screen or other smooth layer. Embodiments select different waveforms to emulate different user sensations and experiences based on user context, pressure, and touch location.

When the device is in a dual display configuration, the GUI-based virtual touchpad is displayed on one device display panel and the haptic engine is operable under an algorithm associated with the virtual touchpad. When the device is in tablet mode, the GUI-based virtual touchpad is removed from the device display panel. The haptic engine is operable under other algorithms other than the algorithm associated with the virtual touchpad.

Embodiments disclosed herein are generally directed to a method for configuring an information handling system as a single display information handling system or a dual display information handling system. The information handling system comprises a first device and a second device, with each device having a display panel for presenting visual content and a display screen proximate the display panel and having a smooth, continuous surface. The method comprises determining if the first device and the second device are in a configuration for operating as a single display information handling system or a dual display information handling system and, based on this determination, displaying visual content on a first device display panel; launching a graphical user interface (GUI) defining a virtual touchpad on a second device display panel of the second device; sensing contact on the second device display screen relative to the virtual touchpad; and generating haptic feedback relative to the virtual touchpad using a haptic engine coupled to the second device display screen. In some embodiments, determining if the first device and the second device are in a configuration for operating as a dual display information handling system or a single display information handling system comprises one or more of determining an orientation of the first device relative to the second device, detecting a keyboard coupled to the second device, and detecting an application executing on the information handling system that requires the information handling system to operate as a dual display information handling system or a single display information handling system. In some embodiments, generating haptic feedback comprises determining if the contact sensed relative to the virtual touchpad corresponds to moving contact or pressure exceeding a click threshold. In some embodiments, sensing contact corresponding to moving contact comprises determining a velocity of the moving contact, selecting a moving contact waveform and a frequency for emulating moving contact over a textured surface based on the determined velocity, and generating haptic feedback using the moving contact waveform at the frequency. In some embodiments, sensing contact corresponding to pressure exceeding a click threshold comprises selecting a click waveform for emulating a button clicking and generating haptic feedback using the click waveform. In some embodiments, selecting a click waveform comprises selecting a high-intensity discharge (HID) waveform. In some embodiments, sensing contact corresponding to pressure exceeding a click threshold comprises sensing pressure in one of two areas of the virtual touchpad. In some embodiments, the haptic engine comprises a plurality of piezoelectric disks adapted for sensing pressure. In some embodiments, generating haptic feedback using the click waveform comprises generating left-click haptic feedback relative to the first area and generating right-click haptic feedback relative to the second area, such as by sending a signal to one or more piezoelectric disks of the plurality of piezoelectric disks based on sensing left-click pressure in a first area of the virtual touchpad or sensing right-click pressure in a second area of the virtual touchpad separate from the first area. In some embodiments, if the information handling system is configured for operating as a dual display information handling system, the method includes removing the GUI from the second device display panel and displaying visual content on the first device display panel and the second device display panel.

In another broad respect, embodiments disclosed herein are generally directed to a dual display information handling system configurable for operating in a single display configuration or in a dual display configuration. Embodiments of a dual display information handling system comprise a first device with a first device display panel for displaying visual content; a second device comprising a second device display panel for displaying visual content and a second device display screen with a smooth surface; a plurality of piezoelectric disks positioned relative to a first edge of the second device display panel and coupled to the second device display screen; and a processor configured for executing a set of instructions. When executed, the instructions cause the processor to determine if the first device and the second device are in a dual display configuration or in a single display configuration. In some embodiments, determining if the information handling system is in a configuration for operating as a dual display information handling system or a single display information handling system comprises one or more of determining an orientation of the first device relative to the second device, detecting a keyboard is coupled to one of the first device or the second device or positioned relative to the second device display screen, and detecting an application executing on the information handling system that requires the information handling system to operate as a dual display information handling system or a single display information handling system. If the dual display information handling system is configured in a single display configuration, the instructions cause the processor to display visual content on the first device display panel; launch a graphical user interface (GUI) on the second device, the GUI defining a virtual touchpad on a second device display panel; sense contact on the second device display screen relative to the virtual touchpad; and send signals to one or more of the plurality of piezoelectric disks to generate haptic feedback through the second device display screen. The plurality of piezoelectric disks are configured for detecting contact with the second device display screen. In some embodiments, the second device comprises an LCD panel proximate the second device display screen, the haptic transfer bracket is coupled to the second device display screen, and the plurality of piezoelectric disks are isolated from the LCD display. In some embodiments, the plurality of piezoelectric disks are distributed across a width of the second device display screen. In some embodiments, a virtual touchpad is defined by an area less than the width of the second device display panel and the processor determines a position and an area of the virtual touchpad on the second device display panel and sends signals to a set of piezoelectric disks based on one or more of the position and area of the virtual touchpad. In some embodiments, the processor defines a first area of the virtual touchpad corresponding to a left-click command, defines a second area of the virtual touchpad corresponding to a right-click command, and determines if contact sensed relative to the virtual touchpad corresponds to moving contact or pressure exceeding a click threshold. If the sensed contact corresponds to moving contact, the processor determines a velocity of the moving contact, selects a moving contact waveform and a frequency for emulating moving contact over a textured surface based on the determined velocity, and sends signals to one or more of the plurality of piezoelectric disks to generate the moving contact waveform at the frequency. If the sensed contact comprises pressure exceeding a click threshold in the first area the processor selects a click waveform for emulating a button clicking and sends signals to a first set of the plurality of piezoelectric disks to generate the click waveform relative to the first area. If the sensed contact comprises pressure exceeding a click threshold in the second area, the processor selects the click waveform for emulating a button clicking and sends signals to a second set of the plurality of piezoelectric to generate the click waveform relative to the second area. In some embodiments, if the information handling system is configured for operating as a dual display information handling system, the processor executes instructions for removing the GUI from the second device display panel and displaying visual content on the first device display panel and the second device display panel.

In another broad respect, embodiments disclosed herein are generally directed to a virtual touchpad system for use in an information handling system configurable in a single display configuration or a dual display configuration. Embodiments of the virtual touchpad system comprise a plurality of piezoelectric discs coupled to a display screen, a database storing a set of waveforms, wherein the set of waveforms include a click waveform and a moving contact waveform, and a processor configured to execute a set of instructions for determining if a first device and a second device are in a single display configuration or in a dual display configuration. If the processor determines the first device and the second device are in a single display configuration, the processor executes instructions for displaying visual content on a first device display panel of the first device; launching a graphical user interface (GUI) virtual touchpad on a second device display panel of the second device; defining a first area of the virtual touchpad corresponding to a left-click command; defining a second area of the virtual touchpad corresponding to a right-click command; sensing contact on the second device display screen relative to the virtual touchpad; and determining if the contact sensed relative to the virtual touchpad corresponds to one of moving contact, pressure exceeding a click threshold in the first area or pressure exceeding a click threshold in the second area. If the sensed contact corresponds to moving contact, the processor determines a velocity of the moving contact; selects a moving contact waveform and a frequency for emulating moving contact over a textured surface based on the determined velocity; and sends signals to one or more of the plurality of piezoelectric disks to generate the moving contact waveform at the frequency. If the sensed contact corresponds to pressure exceeding a click threshold in the first area, the processor executes instructions for selecting the click waveform for emulating a button clicking; and sending signals to a first set of the plurality of piezoelectric disks to generate the click waveform relative to the first area. If the sensed user input comprises pressure exceeding a click threshold in the second area, the processor executes instructions for selecting the click waveform for emulating a button clicking and sending signals to a second set of the plurality of piezoelectric disks to generate the click waveform relative to the second area. In some embodiments, determining if the first device and the second device are in a single display configuration comprises one or more of determining an orientation of the first device relative to the second device, detecting a keyboard is coupled to one of the first device or the second device or positioned relative to the second device display screen, and detecting an application executing on the information handling system that requires the information handling system to operate as a single display information handling system. In some embodiments, if the sensed contact corresponds to moving contact, the processor executes instructions for determining a direction of the moving contact and sending signals to the plurality of piezoelectric disks to generate the moving contact waveform in an order corresponding to the direction of the moving contact. In some embodiments, if the information handling system is configured for operating as a dual display information handling system, the processor executes instructions for removing the GUI from the second device display panel and displaying visual content on the first device display panel and the second device display panel.

In any of the disclosed embodiments, a bracket enables any of a variety of devices to be mounted in a half-bay. Embodiments enable tool-less mounting of multiple types of devices while also enabling ways to easily convert for mounting other types of half-height devices.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
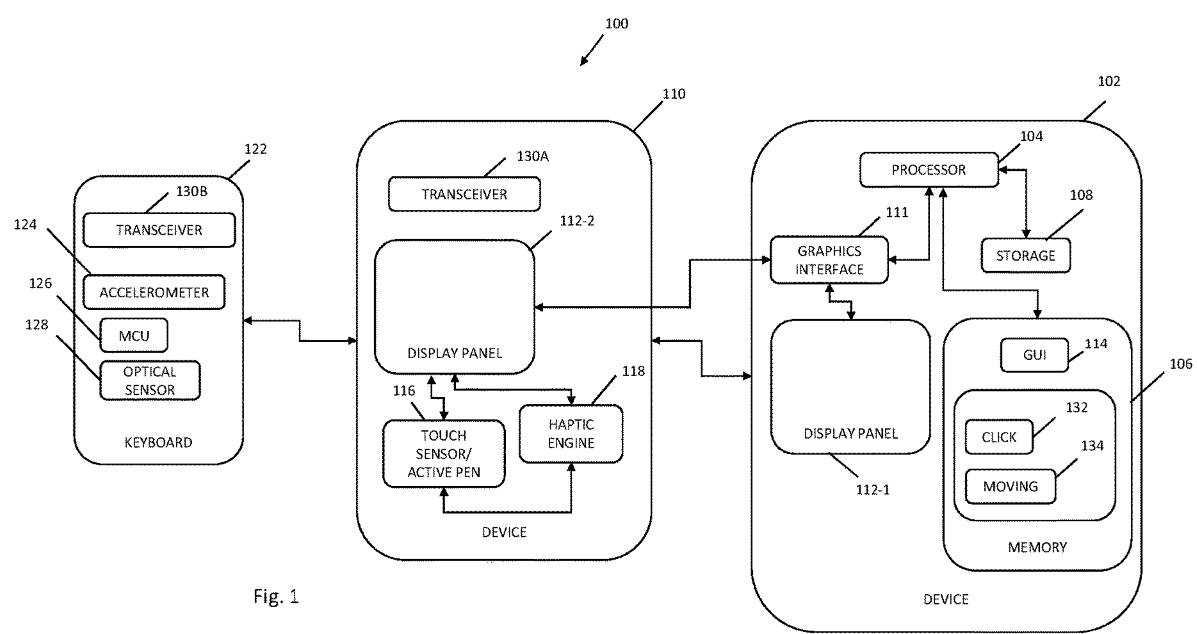
FIG. 1 is an architectural diagram of an exemplary dual display information handling system operable in a dual display configuration and a single display configuration with a GUI-based virtual touchpad.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes.

Dual display information handling systems are gaining more traction in the market due to their capability to function as a laptop or a tablet. In these systems, each device has a display panel for displaying visual content, and the display panel is protected by a display screen having a smooth and continuous surface, such as glass. A popular mode for a dual-display information handling system is a notebook mode in which the user has a traditional keyboard along with a touchpad. A touchpad usually has a textured surface. However, in an information handling system with two devices in which each device has a display screen with a smooth, continuous layer, a touchpad with a textured surface is generally not possible.

Embodiments disclosed herein include information handling systems comprising first and second devices configurable for operating in either of a dual display configuration and in a single display configuration. A dual display configuration refers to a configuration of an information handling system in which visual content is presented on two devices. A tablet computer is one example of an information handling system configured to output visual content to two devices. A single display configuration refers to a configuration of an information handling system in which visual content is presented on a single device. A laptop computer is one example of an information handling system configured to output visual content to a single device, with the other device having a keyboard and a touchpad.

Embodiments disclosed herein extend the functionality of traditional information handling systems into information handling systems configurable as a single display information handling system or a dual display information handling system. Embodiments disclosed herein may operate to display visual content on the first device in any configuration and operate to display visual content on the second device in a dual display configuration or launch a Graphical User Interface (GUI)-based virtual touchpad on the second device in a single display configuration. A processor is configured to launch a GUI-based virtual touchpad on the second device, sense contact relative to the virtual touchpad and provide haptic feedback through the second device display screen.

The information handling system may include memory, one or more processing resources such as a central processing unit (CPU) or hardware or software control logic. Additional components or the information handling system may include one or more storage devices, one or more communications ports for communicating with external devices as well as various input and output (I/O) systems, such as a keyboard, a mouse, and a display panel. The information handling system may also include one or more buses operable to transmit communication between the various hardware components.

Referring specifically to FIG. 1, information handling system 100 includes first device 102 with processor 104 coupled to memory 106 storing graphical user interface (GUI) instructions 114, click waveform instructions 132 and moving contact waveform instructions 134, storage 108, display panel 112-1 and graphics interface 111. Information handling system 100 further comprises second device 110 coupled to first device 102. Second device 110 comprises second device display panel 112-2, touch sensor/active pen 116 and haptic engine 118 coupled to second device display panel 112-2. Keyboard 122 includes microcontroller unit (MCU) 126 coupled to accelerometer 124 and optical sensor 128. Second device 110 is communicatively coupled to keyboard 122 via wireless transceiver 130A and 130B. First device display panel 112-1 and second device display panel 112-2 may be LCD panels or other panels adapted for presenting visual content for a user.

In various embodiments, processor 104 is a single-processor system including one processor, or a multi-processor system including two or more processors. Processor 104 includes any processor capable of executing program instructions. Processor 104 is coupled to system memory 106 configured to store program instructions and/or data, accessible by processor(s) in processor 104.

In various embodiments, system memory 106 may be implemented using memory technology such as static RAM (SRAM), synchronous dynamic RAM (SDRAM), nonvolatile/Flash-type memory, or any other type of memory. In various embodiments, information handling system 100 may be configured to access different types of computer-accessible media separate from system memory 106. A computer-accessible memory device may include any tangible, non-transitory storage media or memory media such as electronic, magnetic, or optical media (e.g., magnetic disk, a hard drive, a CD/DVD-ROM, a Flash memory, etc.) coupled to information handling system 100. Applications stored in memory 106 may be executable when information handling system 100 is in a single display configuration, a dual display configuration, or both. In some embodiments, memory 106 stores GUI instructions 114 executable by processor 104 to launch a graphical user interface (GUI) virtual touchpad on second device display panel 112-2 on second device 110. In some embodiments, memory 106 stores click waveform instructions 132 executable for generating a click waveform emulating a user clicking a button. In some embodiments, memory 106 stores moving contact waveform instructions 134 executable for generating a waveform emulating moving.

Processor 104 is coupled to storage 108 within which can be stored one or more software and/or firmware modules and/or data (not specifically shown). In one embodiment, storage 108 can be a hard drive or a solid-state drive. The one or more software and/or firmware modules within storage 108 can be loaded into system memory 106 during operation of information handling system 100.

Processor 104 is coupled to one or more graphics exchange systems 111 for communicating with devices 102, 110 for displaying visual content on first device display panel 112-1 and second device display panel 112-2.

Processor 104 is further coupled to port(s), pin(s), and/or adapter(s), including wireless transceiver 130-A to enable connection to one or more input devices, such as keyboard 122. In some embodiments, keyboard 122 comprises a wireless transceiver 130B for communicating with wireless transceiver 130A in device 110. In other embodiments (not shown), first device 102 comprises a wireless transceiver for communicating with wireless transceiver 130-B or communication between keyboard 122 and first device 102 or second device 110 is a wired connection.

Information handling system 100 includes haptic engine 118 coupled to processor 104 and configured to execute instructions from processor 104 to provide haptic feedback through second device display panel 112-2.

Figure 2A:
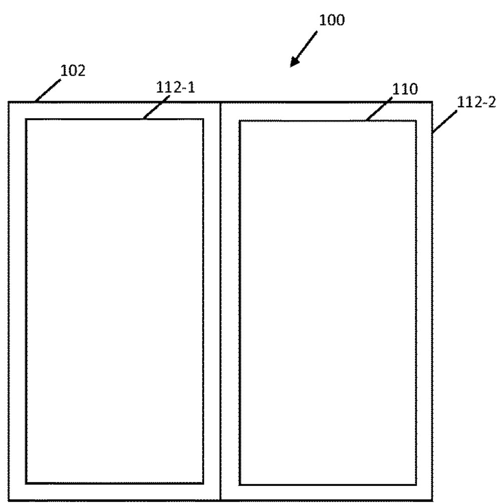
FIG. 2A is a simplified front view of an information handling system operable in a dual display configuration in a tablet mode.
Figure 2B:
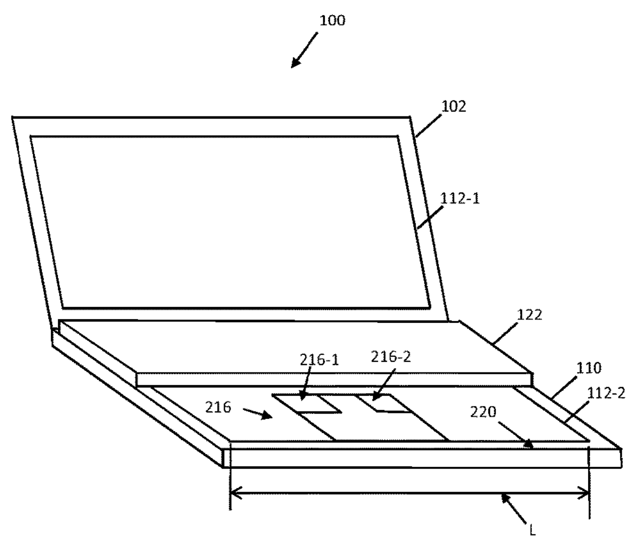
FIG. 2B is an alternate perspective view of the same information handling system depicted in FIG. 2A, but configured for operable in a single display configuration with a virtual touchpad.

Information handling system 100 is configurable for operation as a dual display information handling system or a single display information handling system. In some embodiments, configuring information handling system 100 comprises microcontroller unit (MCU) 126 communicating with accelerometer 124 to detect a change in orientation of keyboard 122, communicating with optical sensor 128 to detect a proximity of keyboard 122 relative to second device 110, detecting a physical connection between keyboard 122 and second device 110, or otherwise detecting when a user is configuring keyboard 122 and second device 110 relative to first device 102 for operation as a single display information handling system. In some embodiments, MCU 126 communicates with accelerometer 124 to determine when both devices 102, 110 are oriented vertically for operation as a dual display information handling system and determine when device 110 is oriented horizontally or orthogonal to first device 102 or when keyboard 122 is coupled to second device 110 for operation as a single display information handling system. FIG. 2A is a simplified front view of an information handling system 100 operating as a dual display information handling system in a dual display configuration such as a tablet mode (and in which keyboard 122 is not attached). FIG. 2B is an alternate perspective view of the same information handling system 100 depicted in FIG. 2A but configured for operating as a single display information handling system in a single display configuration such as a laptop mode. First device 102 is configured to display visual content on first device display panel 112-1 in both the dual display configuration depicted in FIG. 2A and the single display configuration depicted in FIG. 2B. Second device 110 is configured to display visual content on second device display panel 112-2 in the dual display configuration depicted in FIG. 2A but visual content is not displayed on second device display panel 112-2 in the single display configuration depicted in FIG. 2B. Instead, in FIG. 2B, second device 110 is configured to support or otherwise physically couple to keyboard 122 and second device display panel 112-2 is configured to display GUI-based virtual touchpad area 216 including areas defined as left click area 216-1 and right click area 216-2. Virtual touchpad area 216 may be defined with a position anywhere in second device display panel 112-2 along length L of second device display panel 112-2 and sized to encompass any portion of second device panel 112-2 between keyboard 122 and front edge 220 of second device display panel 112-2. Sensors in second device 110 sense contact with second device display panel 112-2 and determine if the sensed contact is associated with virtual touchpad area 216.

Figure 3:
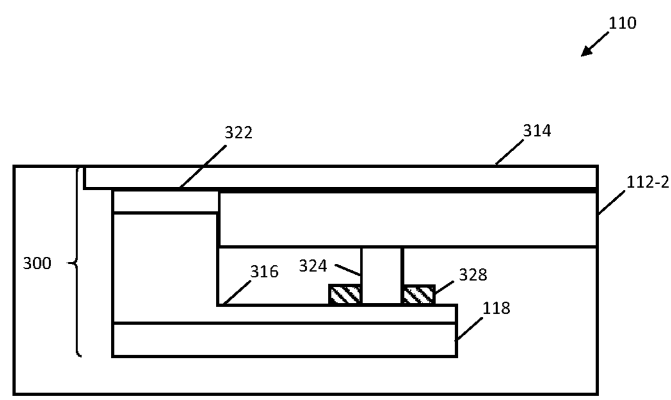
FIG. 3 is a partial perspective view of a display for a dual display information handling system with one embodiment of a haptic feedback system.

A haptic feedback system is coupled to second device for providing haptic feedback through second device display screen 314 relative to virtual touchpad area 216 displayed on second device display panel 112-2. FIG. 3 is a partial perspective view of second device 110 for a dual display information handling system with one embodiment of a haptic feedback system. Second device 110 comprises second device display screen 314 formed as a smooth continuous layer over second device display panel 112-2. Haptic feedback system 300 comprises haptic engine 118 coupled to second device display screen 314. Second device display screen 314 comprises a smooth, continuous surface for user contact and formed from glass or other materials for protecting second device display panel 112-2 and allowing a user to view visual content.

In some embodiments, haptic engine 118 comprises a plurality of piezoelectric sensors to form part of a haptic feedback system associated with a virtual touchpad. The plurality of piezoelectric sensors detect contact with second device display screen 314 and send an electric charge based on impedance to a local processor or processor 104, where the electrical charge is converted to determine a pressure exerted on second device display screen 314. In some embodiments, piezoelectric disks are distributed along one edge 220 of second device display screen 314 and are coupled to second device display screen 314, wherein contact with second device display screen 314 is sensed by one or more of the plurality of piezoelectric disks. Contact sensed by the one or more piezoelectric disks is used to determine if the contact comprises moving contact relative to virtual touchpad 216 or pressure exceeding a click threshold relative to either of virtual touchpad defined areas 216-1 or 216-2. In some embodiments, a processor coupled to haptic engine 118 analyzes the pressure exerted on second device display screen 314 to determine if the pressure exceeds a click threshold indicating a context in which a user is wanting to click a button or if the pressure relative to two or more piezoelectric disks indicates a context in which a user is moving one or more fingers while maintaining contact with second device display screen 314. Analysis indicating moving contact also involves determining a direction and a velocity of the moving contact. Advantageously, piezoelectric disks used to generate signals from a pressure exerted on second device display screen 314 are also operable to convert signals into output forces for providing haptic feedback via second device display screen 314.

In some embodiments, haptic engine 118 is coupled to haptic transfer bracket 316 coupled directly to second device display screen 314. In some embodiments, a thin layer of material 322 interposed between haptic transfer bracket 316 and second device display screen 314 transfers a waveform generated by one or more piezoelectric disks directly to second device display screen 314, and isolation grommets 328 isolate second device display panel 112-2 from haptic feedback generated by haptic engine 118. A waveform generated by haptic engine 118 propagates through haptic transfer bracket 316 to second device display screen 314.

In some embodiments, haptic engine 118 comprises haptic transfer bracket 316 coupled to second device display screen 314 through second device display panel 112-2. In some embodiments, hardware 324 coupled to one or more of haptic engine 118 and haptic transfer bracket 316 transfers haptic feedback through second device display panel 112-2 to second device display screen 314 (not shown).

In some embodiments, haptic engine 118 may be coupled to a local processor such as a processor forming part of a printed circuit board (PCB) coupled to second device display panel 112-2. In some embodiments, a processor coupled to second device display panel 112-2 is adapted to communicate with processor 104 to receive visual content to be displayed on second device display panel 112-2, receive signals from haptic engine 118 relative to virtual touchpad 216, and send commands to haptic engine 118 for generating haptic feedback relative to virtual touchpad 216. In other embodiments, signals from haptic engine 118 are sent to processor 104 and processor 104 sends commands to haptic engine 118 for haptic feedback, and a local processor coupled to second device display panel 112-2 receives instructions from processor 104 regarding visual content to be displayed on second device display panel 112-2.

Figure 4A:
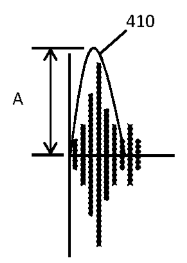
FIG. 4A depicts one embodiment of a click waveform associated with a click on a virtual touchpad.

FIG. 4A depicts one embodiment of click waveform 410 with amplitude A for emulation of a user clicking a button relative to virtual touchpad 216. It will be appreciated by those skilled in the art that a waveform generated to emulate a "click" waveform can vary, and certain embodiments allow a user to select a waveform with a high-intensity discharge (HID) profile that provides haptic feedback allowing the best user experience.

Figure 4B:
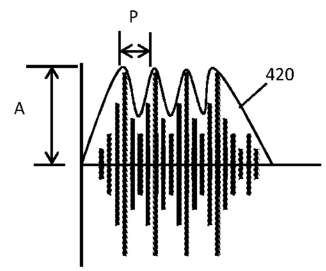
FIG. 4B depicts one embodiment of a moving contact waveform associated with moving contact with a textured surface on a virtual touchpad.

FIG. 4B depicts one embodiment of moving contact waveform 420 with characteristics such as amplitude A and period P for emulating moving contact with a textured surface corresponding to moving contact between a user and second device display screen 314 relative to virtual touchpad 216. Period P of waveform 420 is proportional to moving contact between a user's finger(s) and second device display screen 314 relative to virtual touchpad 216. A moving contact waveform and frequency generated to emulate moving contact relative to a textured surface may be selected to provide a desired feel for the user, and moving contact waveform characteristics can be selected by a user to provide haptic feedback allowing the best user experience.

Figure 5:
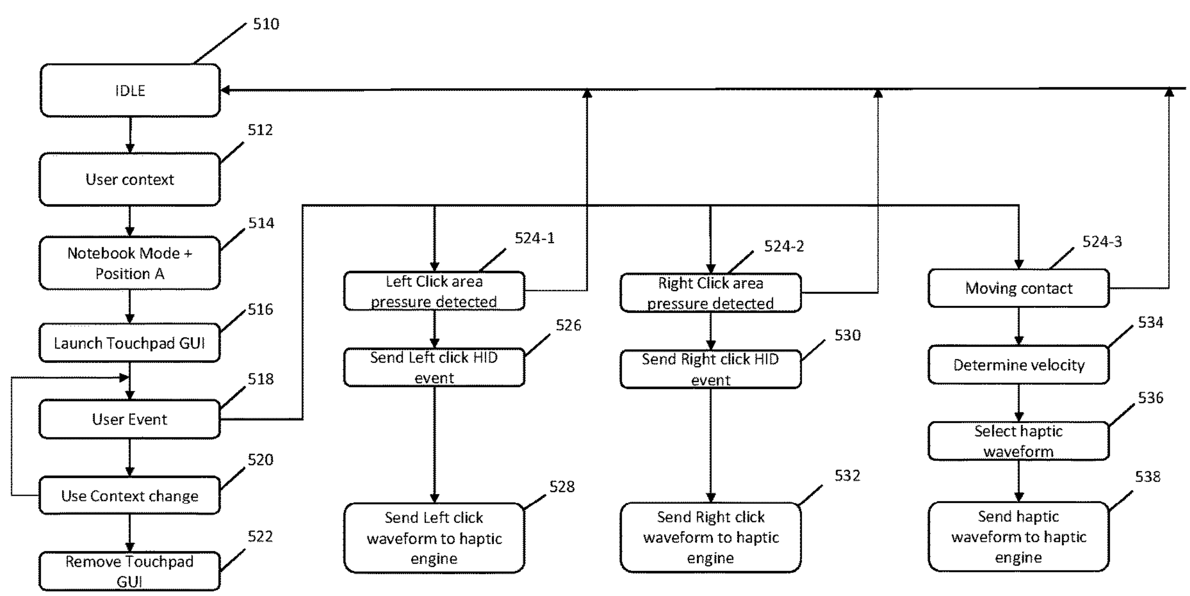
FIG. 5 is a flow diagram depicting selected elements of one embodiment of a method for configuring a dual display information handling system operable in a dual display configuration or a single display configuration with a virtual touchpad.

FIG. 5 is a flow diagram depicting selected elements of one embodiment of a method for operating an information handling system in a dual display configuration or a single display configuration with a virtual touchpad.

Method 500 starts at step 510 when information handling system 100 is in an idle state, which refers to a state in which information handling system 100 is in a configuration for receiving user input.

In step 512, information handling system 100 detects user context indicating information handling system 100 is to be used in a single display configuration or a dual display configuration. Information handling system 100 may use information from accelerometer 124, optical sensor 128, or other sensors on information handling system 100 to determine information handling system 100 is picked up, rotated, opened, closed, or otherwise being reconfigured from the idle state configuration to a single display configuration.

In step 514, information handling system 100 determines if a user has configured information handling system 100 for operating in a single display configuration including detecting a configuration of information handling system 100 in which keyboard 122 is coupled to second device 110. In certain embodiments, detecting a configuration of information handling system 100 comprises determining an orientation of one or more devices 102, 110, such as detecting when both devices 102, 110 are oriented vertically, detecting an orthogonal orientation of device 110 relative to device 102 or detecting when a hinge coupling device 110 to device 102 is at a predetermined angle. In some embodiments, detecting a configuration of information handling system 100 comprises determining when keyboard 122 is coupled to device 110. In some embodiments, detecting a configuration of information handling system 100 comprises detecting an application executing on information handling system 100, wherein the application requires information handling system 100 to operate in a single display configuration.

If information handling system 100 determines that a single display configuration is detected, in step 516, instructions 114 to launch Graphical User Interface (GUI) based touchpad 216 are executed and virtual touchpad 216 is positioned and sized for second device display panel 112-2 on second device 110. The position, outline, size or other characteristic of virtual touchpad 216 can vary. In certain embodiments, one or more of the characteristics of virtual touchpad 216 are set by the user. For example, in the embodiment depicted in FIG. 2B, virtual touchpad 216 is sized to use less than the total length of second device display panel 112-2, is centered along the length of second device display panel 112-2 and is positioned near front edge 220.

In step 518, information handling system 100 is configured for use in a single display configuration with virtual touchpad 216 launched and information handling system is configured to detect user contact with second device display screen 314 and determine if the user contact corresponds with user interaction with virtual touchpad 216.

In step 520, information handling system 100 is adapted to detect user context changes to its orientation and configuration and determine if the user is changing the configuration of information handling system 100. In some cases, a user may be repositioning information handling system 100 or changing the orientation of information handling system 100 to account for changes in the environment in which information handling system 100 is being used. For example, a user may adjust an angle of device 110 due to changes in lighting or may adjust an orientation of information handling system 100 for more privacy. In these cases, information handling system 100 maintains virtual touchpad 216 on second device display panel 112-2 and continues to operate in a single display configuration. In other cases, information handling system 100 may determine a user wants to switch operation of information handling system 100 from a single display configuration to a dual display configuration. In step 522, information handling system 100 removes GUI-based virtual touchpad 216 from second device display panel 112-2 and operates in a dual display configuration. In a dual display configuration, haptic engine

118 is still operable to provide haptic feedback using other algorithms and waveforms for other applications running on information handling system 100.

FIG. 5 further depicts selected elements for generating haptic feedback relative to a GUI-based virtual touchpad. In step 518, user contact with second device display screen 314 is detected. In certain embodiments, piezoelectric disks detect user contact with second device display screen 314 and send an electrical charge or other signal to processor 104 for processing. In certain embodiments, each device 102, 110 has a local processor such as a microcontroller unit (MCU) and the signal is sent to the local processor for determining user contact with second device display screen 314.

In step 524-1, information handling system 100 determines if user contact with second device display screen 314 is in virtual touchpad area 216-1 associated with a left-click operation of virtual touchpad 216. In some embodiments, a processor receives signals from piezoelectric disks in second device 110 and analyzes the signals to determine a pressure and further analyzes the pressure to determine if it exceeds a click threshold. If so, then in step 526, a click waveform is selected. In some embodiments, left-click High-Intensity Discharge (HID) event information is sent to processor 104 and in step 528, processor 104 sends click waveform 132 to one or more piezoelectric disks in haptic engine 118 to generate a click waveform associated with left-click area 216-1 of virtual touchpad 216.

In step 524-2, information handling system 100 determines if user contact with second device display screen 314 is in virtual touchpad area 216-2 associated with a right-click operation of virtual touchpad 216. In some embodiments, a processor receives signals from piezoelectric disks in second device 110 and analyzes the signals to determine a pressure and further analyzes the pressure to determine if it exceeds a click threshold. If so, then in step 530, a click waveform is selected. In some embodiments, right-click High-Intensity Discharge (HID) event information is sent to processor 104 and in step 532, processor 104 sends click waveform 132 to one or more piezoelectric disks in haptic engine 118 to generate a click waveform associated with right-click area 216-2 of virtual touchpad 216.

Signals for a left-click waveform and a right click-waveform may be identical but sent to different individual piezoelectric disks or sets of multiple piezoelectric disks or sent to the same set of piezoelectric disks but with different parameters for piezoelectric disks, whereby a user contacting left-click area 216-1 will receive haptic feedback distinguishable from haptic feedback associated with right-click area 216-2.

In step 524-3, information handling system 100 determines moving contact relative to virtual touchpad 216. In some embodiments, a processor receives signals from multiple piezoelectric disks and analyzes the signals to determine the contact corresponds to moving contact relative to virtual touchpad 216.

In step 534, a processor receives electrical charges from multiple piezoelectric disks and determines a velocity and a direction of the moving contact.

In step 536, the processor selects moving contact waveform 134 corresponding to the moving contact and determines a frequency associated with moving contact waveform 134. Moving contact waveform 134 and the frequency are selected for haptic feedback. The selection of a waveform and frequency may be based on improving user experience, such as emulating moving contact between the user and a textured surface or for reducing sliding friction between a finger and second device display layer 314.

In step 538, the processor sends moving contact waveform 134 with the selected frequency to haptic engine 118. In certain embodiments, moving contact waveform 134 and frequency reduce sliding friction between the user and second device display screen 314. In some embodiments, processor 104 sends moving contact waveform 134 to two or more of the plurality of piezoelectric disks in haptic engine 118, wherein the frequency and a sequence in which the two or more piezoelectric disks generate the haptic feedback emulate the experience of moving a finger across a textured surface in a direction even though second device display screen 314 is smooth. In certain embodiments, the user selects moving contact waveform 134 and frequency.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that information handling system 100 is merely illustrative and is not intended to limit the scope of the disclosure described herein. Any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated. For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for configuring an information handling system as a single display information handling system or a dual display information handling system, the information handling system comprising a first device and a second device, each device comprising a display panel for presenting visual content and a display screen with a smooth surface, the method comprising:

determining if the first device and the second device are in a configuration for operating as a single display information handling system or a dual display information handling system; and based on determining that the information handling system is configured for operation as a single display information handling system:

displaying visual content on a first device display panel;

launching a graphical user interface (GUI) on the second device, the GUI defining a virtual touchpad on a second device display panel;

sensing contact on the second device display screen relative to the virtual touchpad;

determining if the contact sensed relative to the virtual touchpad corresponds to moving contact or pressure exceeding a click threshold;

if the sensed contact corresponds to moving contact:

determining a velocity of the moving contact;

selecting a moving contact waveform for emulating moving contact over a textured surface based on the determined velocity; and sending signals to one or more piezoelectric disks of a plurality of piezoelectric disks to generate the moving contact waveform, if the sensed contact corresponds to pressure exceeding a click threshold:

determining an area associated with the pressure;

selecting a click waveform for emulating a button clicking; and sending signals to a first set of the plurality of piezoelectric disks to generate the click waveform relative to the area.

2. The method of claim 1, wherein:

determining if the first device and the second device are in a configuration for operating as a dual display information handling system or a single display information handling system comprises one or more of determining an orientation of the first device relative to the second device, detecting a keyboard coupled to the second device, and detecting an application executing on the information handling system that requires the information handling system to operate as a dual display information handling system or a single display information handling system.

3. The method of claim 1, wherein selecting a moving contact waveform comprises selecting a frequency for emulating the moving contact over a textured surface based on the determined velocity.

4. The method of claim 3, wherein:

selecting a click waveform comprises selecting a high-intensity discharge (HID) waveform.

5. The method of claim 1, further comprising:

defining a first area of the virtual touchpad corresponding to a left-click command; and defining a second area of the virtual touchpad corresponding to a right-click command separate from the first area, wherein:

sensing contact corresponding to pressure exceeding a click threshold comprises one of sensing pressure in the first area of the virtual touchpad and sensing pressure in the second area of the virtual touchpad; and generating haptic feedback using the click waveform comprises:

selecting a click waveform for emulating a button clicking; and if the sensed contact comprises pressure exceeding a click threshold in the first area, sending signals to a first set of the plurality of piezoelectric disks to generate the click waveform relative to the first area; and if the sensed contact comprises pressure exceeding a click threshold in the second area:

sending signals to a second set of the plurality of piezoelectric to generate the click waveform relative to the second area.

6. A dual display information handling system configurable for operating in a single display configuration or in a dual display configuration, the dual display information handling system comprising:

a first device with a first device display panel for displaying visual content;

a second device comprising a second device display panel for displaying visual content and a second device display screen with a smooth surface;

a plurality of piezoelectric disks positioned relative to a first edge of the second device display panel and coupled to the second device display screen; and a processor configured for executing a set of instructions for:

determining if the first device and the second device are in a dual display configuration or in a single display configuration; and based on the dual display information handling system configured in a single display configuration:

displaying visual content on the first device display panel;

launching a graphical user interface (GUI) on the second device, the GUI defining a virtual touchpad on a second device display panel;

sensing contact on the second device display screen relative to the virtual touchpad;

if the sensed contact corresponds to moving contact relative to the virtual touchpad:

determining a velocity of the moving contact;

selecting a moving contact waveform and a frequency for emulating moving contact over a textured surface based on the determined velocity; and sending signals to one or more of the plurality of piezoelectric disks to generate the moving contact waveform at the frequency.

7. The dual display information handling system of claim 6, wherein:

the plurality of piezoelectric disks are configured for detecting contact with the second device display screen.

8. The dual display information handling system of claim 6, further comprising:

a keyboard adapted for coupling to one of the first device or the second device; wherein determining if the information handling system is in a configuration for operating as a dual display information handling system or a single display information handling system comprises one or more of determining an orientation of the first device relative to the second device, detecting the keyboard is coupled to one of the first device or the second device or positioned relative to the second device display screen, and detecting an application executing on the information handling system that requires the information handling system to operate as a dual display information handling system or a single display information handling system.

9. The dual display information handling system of claim 6, wherein:

the second device comprises an LCD panel proximate the second device display screen;

the haptic transfer bracket is coupled to the second device display screen; and the plurality of piezoelectric disks are isolated from the LCD display.

10. The dual display information handling system of claim 6, wherein:

the plurality of piezoelectric disks are distributed across a width of the second device display screen, in a single display configuration, the virtual touchpad is defined by an area less than the width of the second device display panel; and the processor executes a set of instructions for:

determining a position and an area of the virtual touchpad on the second device display panel; and sending signals to a set of piezoelectric disks of the plurality of piezoelectric disks, wherein the set of piezoelectric disks is based on one or more of the position and area of the virtual touchpad.

11. The dual display information handling system of claim 6, wherein the processor executes a set of instructions for:

defining a first area of the virtual touchpad corresponding to a left-click command;

defining a second area of the virtual touchpad corresponding to a right-click command;

if the sensed contact corresponds to pressure exceeding a click threshold:

if the sensed contact comprises pressure exceeding a click threshold in the first area:

selecting a click waveform for emulating a button clicking; and sending signals to a first set of the plurality of piezoelectric disks to generate the click waveform relative to the first area;

if the sensed contact comprises pressure exceeding a click threshold in the second area:

selecting the click waveform for emulating a button clicking; and sending signals to a second set of the plurality of piezoelectric to generate the click waveform relative to the second area.

12. A virtual touchpad system for use in an information handling system configurable in a single display configuration or a dual display configuration, the virtual touchpad system comprising:

a processor configured to execute a set of instructions for:

determining if a first device and a second device are in a single display configuration or in a dual display configuration;

based on determining the first device and the second device are in a single display configuration:

displaying visual content on a first device display panel of the first device;

launching a graphical user interface (GUI) virtual touchpad on a second device display panel of the second device;

defining a first area of the virtual touchpad corresponding to a left-click command;

defining a second area of the virtual touchpad corresponding to a right-click command;

sensing contact on the second device display screen relative to the virtual touchpad;

determining if the contact sensed relative to the virtual touchpad corresponds to one of moving contact, pressure exceeding a click threshold in the first area or pressure exceeding a click threshold in the second area;

if the sensed contact corresponds to moving contact:

determining a velocity of the moving contact;

selecting a moving contact waveform and a frequency for emulating moving contact over a textured surface based on the determined velocity; and sending signals to one or more of the plurality of piezoelectric disks to generate the moving contact waveform at the frequency, if the sensed contact corresponds to pressure exceeding a click threshold in the first area:

selecting the click waveform for emulating a button clicking; and sending signals to a first set of the plurality of piezoelectric disks to generate the click waveform relative to the first area; and if the sensed user input comprises pressure exceeding a click threshold in the second area:

selecting the click waveform for emulating a button clicking; and sending signals to a second set of the plurality of piezoelectric disks to generate the click waveform relative to the second area.

13. The touchpad system of claim 12, wherein:

determining if the first device and the second device are in a single display configuration comprises one or more of determining an orientation of the first device relative to the second device, detecting a keyboard is coupled to one of the first device or the second device or positioned relative to the second device display screen, and detecting an application executing on the information handling system that requires the information handling system to operate as a single display information handling system.

14. The touchpad system of claim 12, wherein:

if the sensed contact corresponds to moving contact:

determining a direction of the moving contact; and sending signals to the plurality of piezoelectric disks to generate the moving contact waveform in an order corresponding to the direction of the moving contact.

* * * * *